United States Patent
Grossmann

(10) Patent No.: US 6,302,541 B1
(45) Date of Patent: Oct. 16, 2001

(54) METHOD AND DEVICE FOR AUTOSTEREOSCOPY

(76) Inventor: Christoph Grossmann, Hochallee 70, Hamburg, D-20149 (DE)

(*) Notice: Subject to any disclaimer, the term of this patent is extended or adjusted under 35 U.S.C. 154(b) by 0 days.

(21) Appl. No.: 09/719,505

(22) PCT Filed: Nov. 6, 1998

(86) PCT No.: PCT/EP98/07095

§ 371 Date: Dec. 12, 2000

§ 102(e) Date: Dec. 12, 2000

(87) PCT Pub. No.: WO99/67956

PCT Pub. Date: Dec. 29, 1999

(30) Foreign Application Priority Data

Jun. 20, 1998 (DE) .............................. 198 27 590

(51) Int. Cl.⁷ ...................................... A61B 3/02
(52) U.S. Cl. ............................. 351/240; 359/463
(58) Field of Search ..................... 351/201, 202, 351/240; 382/154, 302; 359/462, 463, 464, 466, 475, 619, 629, 636

(56) References Cited

U.S. PATENT DOCUMENTS 5,568,313 * 10/1996 Steenblik et al. .............. 359/463
6,084,978 * 7/2000 Taylor et al. .................. 382/154

FOREIGN PATENT DOCUMENTS

| | | |
|---|---|---|
| 4114023 | 11/1992 | (DE) . |
| 4123895 | 1/1993 | (DE) . |
| 19640936 | 4/1998 | (DE) . |
| 0226115 | 6/1987 | (EP) . |
| 0354851 | 2/1990 | (EP) . |
| 0540137 | 5/1993 | (EP) . |
| 0744872 | 11/1996 | (EP) . |
| WO9203021 | 2/1992 | (WO) . |

OTHER PUBLICATIONS

Bernd Kost, "Konstruktion von Zwischenansichten für Multi–Viewpoint–3DTV–Systeme," *Fernseh–und Kino–Technik*, 42, Jahrgang, Nr. 2/1988, pp. 67–73.

* cited by examiner

Primary Examiner—George Manuel
(74) Attorney, Agent, or Firm—Richard M. Goldberg

(57) ABSTRACT

A method for the autostereoscopic representation of images on a screen (12), for which the image information for the right eye (RA) and the left eye (LA) of a viewer is represented segmentally interleaved on the screen and a barrier (18; 18') is disposed, so that, for each eye, in each case only the image information associated with it is visible, wherein in each segment (28), in addition to the image information (L12–L15; L214 L5) assigned to this segment, a copy of a portion of the image information (L11, L16; L1, L6) is presented, which is assigned to one or both adjacent segments (32; 30") for the same eye.

20 Claims, 8 Drawing Sheets

METHOD AND DEVICE FOR AUTOSTEREOSCOPY

BACKGROUND OF THE INVENTION

The invention is a method for the autostereoscopic representation of images on a screen, for which the image information for the right eye and the left eye of a viewer is represented segmentally interleaved on the screen and a barrier is disposed, so that, for each eye, only the image information, associated with it is visible.

Such methods are used, for example, to represent a seemingly three-dimensional picture on the computer screen to the user of a computer.

The basic principle of the autostereoscopic representation of images consists of representing partial images, which in each case show the same object from different viewing directions, on the screen either simultaneously (space division multiplex) or time-offset with a rapid sequence of changing images (time division multiplex) and which in each case are visible only when the screen is viewed from an appropriate viewing direction. If the image is viewed only by a single user from a fixed viewing position, it is sufficient to show two half images, which correspond to the image information for the left eye and the right eye.

In the case of some known systems, the image information for the left eye and the right eye is separated with the help of suitable spectacles, such as shutter spectacles or polarization spectacles. However, these systems have the disadvantage that the user is affected by wearing these spectacles. On the other hand, autostereoscopic methods or devices have the advantage that the spatial impression can be perceived with the "unarmed eye". In this case, a so-called parallax barrier, referred to in the following in abbreviated fashion as "barrier", ensures that the half image intended for the right eye, is invisible for the left and vice versa. The barrier can be formed, for example, by a lens raster or prism raster or by an aperture raster, which is disposed before the screen. Under some circumstances, such as in the case of transmitted light LCD screens or in the case of a rear projection screen, the aperture raster can also be disposed behind the screen.

In the case of known autostereoscopic methods, for which a raster screen with a particular pixel raster is used as a screen, such as is the case, for example, with conventional cathode ray picture tubes or liquid crystal (LCD) screens, and for which the half images for the right eye and for the left eye are interleaved segmentally with one another, the segments generally have the width of a single screen pixel. Thus, if the pixels of a screen cell are numbered consecutively, all odd-numbered pixels, for example, form the half image for the left eye and all even-numbered pixels, the half image for the right eye. These known systems react basically very sensitively to changes in the viewing position. If the user moves his head only slightly to the side or if the viewing distance is changed slightly, the correct allocation between the screen pixels and the eyes of the viewer and, with that, the three-dimensional impression of the image is also lost.

The DE 195 00 699 A1 discloses a method of the type named above, for which the viewing position is monitored continuously with the help of a head or eye tracking system and, in the event of a change in the viewing position, the barrier is adjusted automatically. For example, in the case of a barrier, constructed as prism raster, the adjustment takes place owing to the fact that the barrier is moved mechanically. If the barrier is formed by a line shadow raster LCD, the adjustment can also be made electronically by suitably triggering this LCD. However, in the case of this known method also, a high precision is required for the configuration and adjustment of the barrier, so that a clean channel separation is achieved. A particular problem consists therein that, in the case of most of the computer screens customary at the present time, especially in the case of cathode ray picture tubes, the screen surface is not completely flat, but curved slightly. This results in distortions, which can hardly be controlled by appropriately adapting the barrier. A further problem consists in that the head or eye tracking system and the adjusting system for the barrier, which is connected in series, operate with a certain delay so that the quality of the threedimensional picture reproduction cannot be maintained permanently if the viewer moves.

In Applicant's international patent application with earlier priority, later published as WO98/53616, a method is already proposed for which the mutually interleaved segments on the screen each have a width of several pixels. This has the advantage that, when the channel separation is not exact, only the pixels at the edges of the segments are affected by cross talk, so that, over all, a larger tolerance for change in the position of the viewer is achieved. In addition, the possibility exists of compensating for changes in the viewing distance very rapidly and without mechanically movable parts owing to the fact that the width of the segments is adapted correspondingly. Likewise, by a suitable selection of the width of the segments, it is also possible to compensate for effects caused by the curvature of the screen. From this, the advantageous possibility arises of retrofitting existing computer screens inexpensively with an autostereoscopic device.

In the aforementioned older application, it is also already proposed that the width of the segments, invisible to the eye be enlarged at the expense of the width of the visible segments, in order to achieve a certain "safety distance" in this way and, with that, a clean separation of the channels.

SUMMARY OF THE INVENTION

It is an object of the present invention to further improve the tolerance with respect to positional changes of the viewer.

This objective is accomplished by a method owing to the fact that in each segment, in addition to the image information assigned to this segment, a copy of a portion of the image information is presented, which is assigned to one or both adjacent segments for the same eye.

Accordingly, in the case of this solution also, the information, presented in each individual segment, consists of several pixels adjacent to one another in the line direction. The advantages of the system, proposed in the older application, therefore apply also to the object of the present invention. However, the special feature of the inventive solution consists therein that the information, presented on the screen at a given time, is to some extent redundant. By these means, it is possible to offer each eye of the viewer the correct and complete image information, even when the viewing position is varied within certain limits, without adjusting the barrier.

For the inventive method also, the position of the head or the eye of the viewer preferably is followed and the barrier and/or the screen contents are adapted automatically. Because of the redundancy of the system that has been mentioned, unavoidable time delays in this adaptation do not lead to a temporary loss of information. The adaptation processes, to some extent, take place in the background and are invisible for the viewer, so that a constant good quality is ensured even in the case of more rapid head movements.

The use of a barrier in the form of a lens raster, for example, a raster of vertically extending cylindrical lenses, has the advantage that a high light intensity is attained and an expensive driver system for the barrier is not required. In this case, the adaptation to positional changes of the viewer takes place only by an adaptation of the image information presented on the screen.

To some extent, the cylindrical lenses cause an astigmatism. However, in the case of the inventive system, this proves to be an advantage and not a disadvantage, because it is possible, by these means, to avoid or at least alleviate a problem known as the accommodation convergence problem. Briefly stated, this problem consists therein that the human visual system obtains information concerning the distance of a particular point of the object viewed not only from the different parallax of the half images for the left eye and the right eye, but also from the accommodation of the lens of the eye, which is required for focusing the image. If the point of the object, because of the parallax, appears to lie in front of or behind the plane of the screen, the information concerning these two distances is contradictory, so that the visual system is irritated. As a result of the astigmatism mentioned, unambiguous distance information cannot be derived from the accommodation of the lens of the eye, so that the contradiction is resolved or moderated.

A further effect of the use of cylindrical lenses consists therein that the visible parts of the screen appear to the viewer to be enlarged in the line direction. The image, shown on the screen, must therefore initially be compressed by this magnification factor. Since the resolution of the raster screen is limited, this necessarily leads to a certain loss of resolution in the line direction. In accordance with a further development of the invention, a possibility is created, at least in the case of color screens with color pixels disposed offset in the line direction, to compensate partly for this loss of resolution.

The object of the invention therefore also is a method for improving the resolution in the line direction when an image is presented on a color screen with color pixels disposed offset in the line direction, wherein the image information for three adjacent color triplets is shown in the time division multiplex method on the screen, the three color pixels, which are combined to show a color triplets, being offset from one another in each case by one color pixel.

As is customary, in each case three adjacent color pixels are used to represent a color triplet, namely one each in each of the three basic colors, so that the shade of the image point, represented by this triplet, can be reproduced correctly. However, since these same three color pixels are not always used for the time-offset reproduction of the color triplets and, instead, the group of the three color pixels is always offset by one color pixels, the centers of gravity of the three color triplets, reproduced consecutively, are also offset in an appropriate manner from one another, said that the spatial information contained in the three color pixels is not lost. Accordingly, after a remagnification with the help of the cylindrical lenses, the spatial information is available once again.

BRIEF DESCRIPTION OF THE DRAWINGS

In the following, examples of the invention are explained in greater detail by means of the drawing, in which.

DETAILED DESCRIPTION

Figure 1:
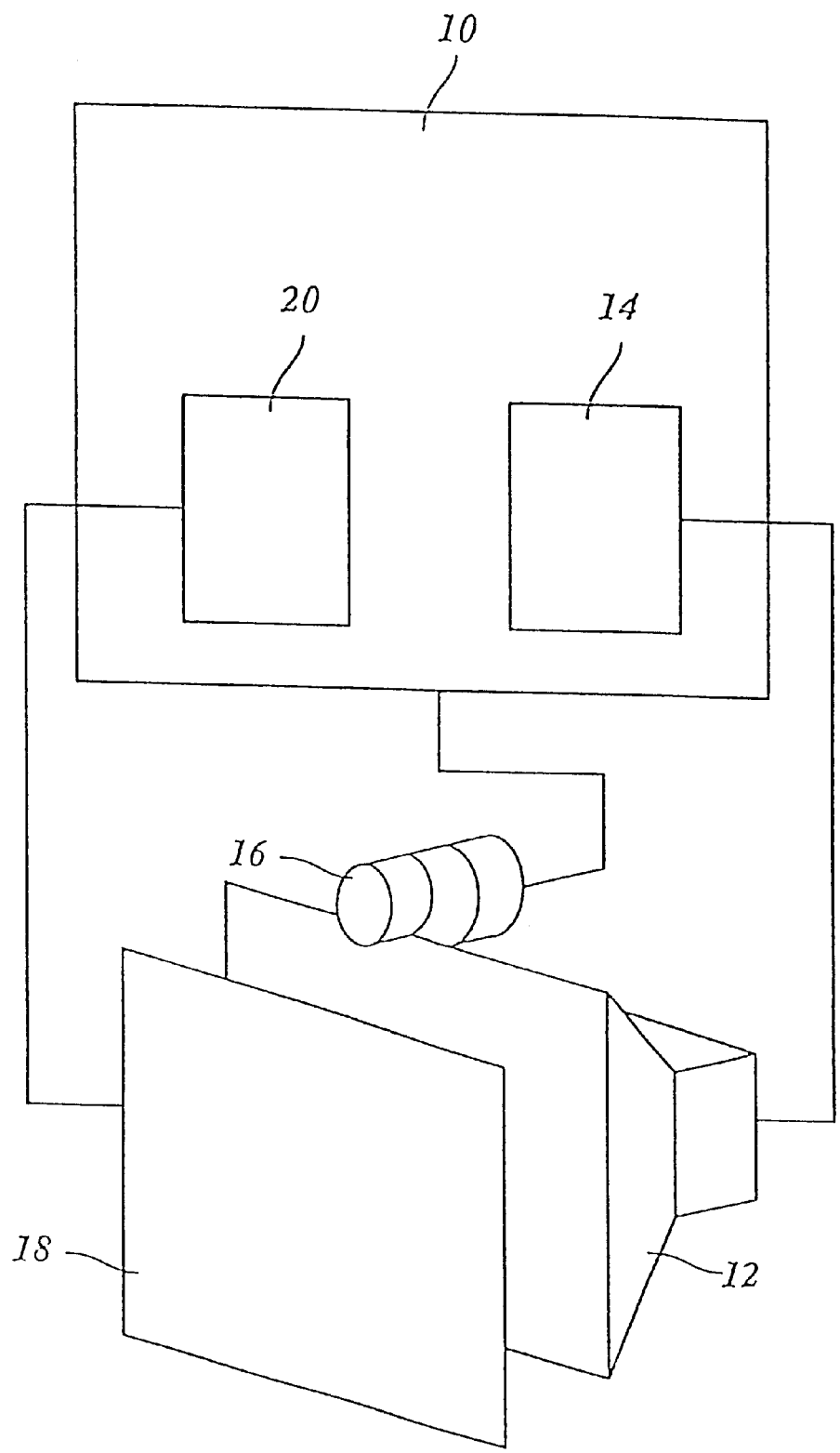
FIG. 1 shows a block diagram of the inventive device.

The device for the autostereoscopic representation of images, shown in FIG. 1, comprises a computer system 10, a screen 12 such as a CRT or LCD screen, which is controlled over a graphic card 14 of the computer system, a head-tracking system or eye-tracking system 16 and a barrier 18, which is disposed, in the examples shown, at a distance in front of the screen 12. The barrier 18 may, for example, be a lens raster sheet. Alternatively, the barrier may also be formed by an LCD screen, with which a pattern of alternating transparent and opaque strips can be generated by a suitable control system. In the latter case, the computer system 10 additionally contains a driver system 20 for controlling the LCD screen.

Figure 2:
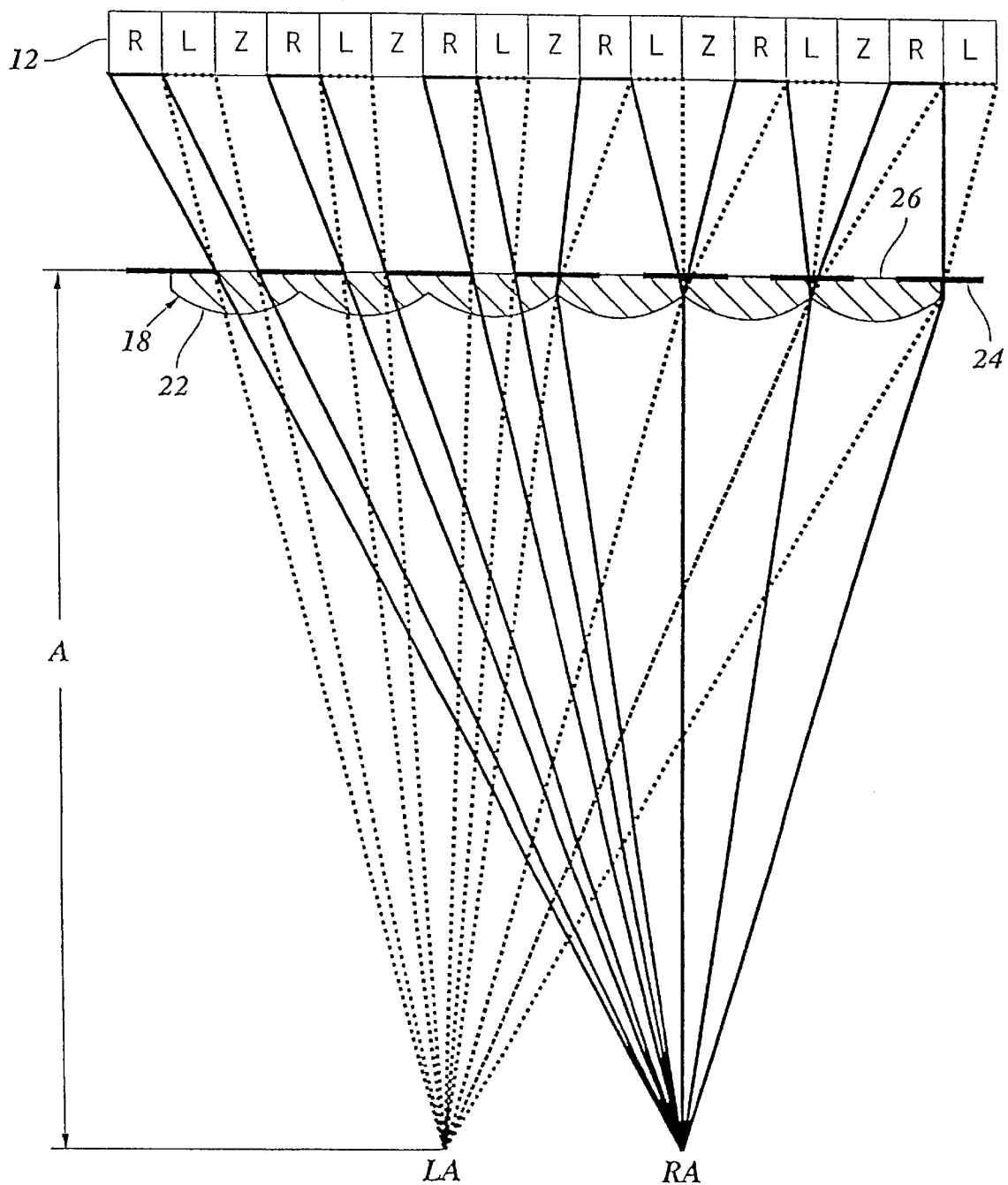
FIGS. 2 and 3 show a diagrammatic representation to explain the optical properties of the device.
Figure 3:
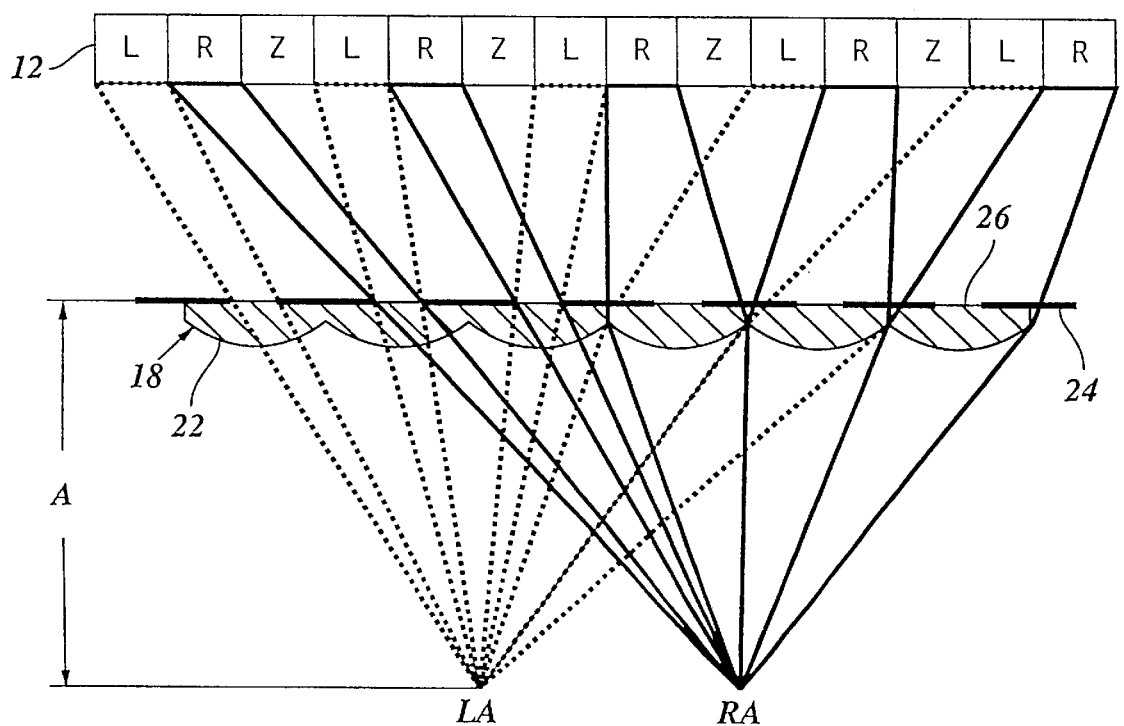
Figure 4:
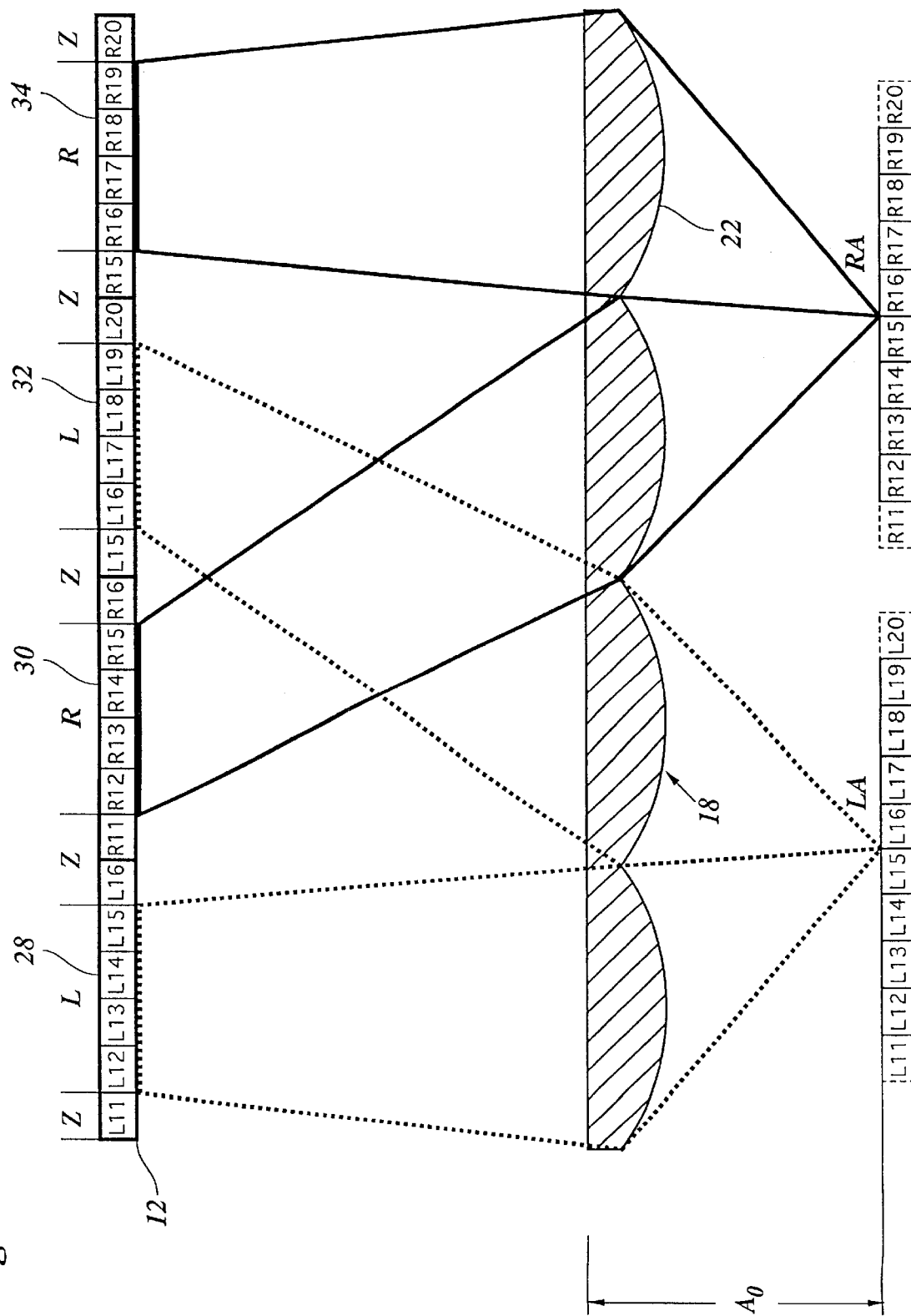
FIGS. 4 and 5 show diagrams to explain a first embodiment of the inventive method.

To explain the principle of functioning of the invention by means of FIGS. 2 to 4, it must initially be assumed that the barrier 18 is a lens raster with a plurality of vertical cylindrical lenses 22. The lens raster 18 is disposed at a fixed distance in front of the screen 12, which is represented in FIGS. 2 and 3 by a bar, which is divided into several zones R, L and Z. The positions of the left eye and right eye of the viewer are labeled LA and RA.

Zones R on the screen 12 are those zones, which are each seen enlarged by the right eye RA through a single cylindrical lens 22. Correspondingly, the left eye LA perceives the zones L enlarged on the screen. Zones Z are intermediate zones, which can be perceived neither by the left eye nor by the right eye.

In FIGS. 2 and 3, a sequence of diaphragms 24, between which slots 26 are formed, are additionally shown in the plane of the lens raster 18. The diaphragms and slots symbolize transparent and opaque vertical strips of a mask, which would produce the same pattern of zones R, L and Z as the lens raster 18.

In FIGS. 2 and 3, the beam path of the lens raster 18 is shown in each case for the right half of the screen 12. In this connection, the vision rays, emanating from the left eye, are represented by broken lines and those emanating from the right eye by continuous lines. In each case, the equivalent beam path for mask 24, 26 is shown for the right half of the screen. This beam path merely shows the geometric relationships more clearly, since the refraction properties of the cylindrical lenses do not have to be taken into consideration here.

In the example shown, the screen 12 is assume to be flat. Under these circumstances, all diaphragms 24 have the same width and the slots 26, formed between them, also all have the same width. If the screen 12 were curved, the pattern of the zones R, L and Z on the screen could assume the same form as in the case of a flat screen by varying the width of the slots and diaphragms or by changing the geometry of the cylindrical lenses 22. In the case of a screen, which is curved only in one dimension, the lens raster 18, formed by a sheet, could also follow this curvature. The focal distance of the individual cylindrical lenses 22 optionally should be matched to the distance between the lens raster and the screen, measured along the respective optical axis.

In the example shown, the ratio of the width of the diaphragms 24 to the width of the slots 26 is 2:1. The sum of the width of a single diaphragm 24 and the width of a single slot 26 is referred to as pitch dimension of the diaphragm raster. This pitch dimension is equal to the pitch dimension of the lens raster 18, that is, equal to the width of a single cylindrical lens 22. If the pitch dimension is divided by the width of a single slot 26, the value 3 is obtained in the example shown. This value is referred to as the "selection number" of the diaphragm raster. Because of the equivalence between the diaphragm raster and the lens raster, the selection number of the lens raster 18 can be defined correspondingly. In the example shown, the selection number of the lens raster also has the value of 3. Under these conditions, the total width of the invisible zones Z on the screen is exactly one-third of the line length, that is, one-third of the screen line is completely invisible to the viewer.

In FIG. 2, the viewing distance A, that is, the distance between the plane of the lens raster 18 and the plane of the eyes LA, RA, has the maximum possible value, at which the zones R and L do not yet overlap on the screen. At a larger viewing distance, a complete channel separation could no longer be ensured, since the screen pixels, lying in the overlapping zone, would be visible to the left eye as well as to the right eye.

In FIG. 3, the viewing distance A has the least possible value. At a smaller viewing distance, the zones L and R would overlap once again on the screen. The larger the selection number of the lens raster or generally of the barrier 18, the greater is also the width of the zones Z and the greater correspondingly is the region, in which the viewing distance A can vary, without affecting the channel separation.

If, starting out from the state shown in FIG. 3, the viewing distance A is enlarged once again, zones L and R move apart once again so that new intermediate zones are formed between them, while the intermediate zones Z, originally present, shrink. At an optimum viewing distance $A_0$ in the center between the maximum value and the minimum value, there is an intermediate zone, which is exactly half as wide (at selection number 3) as each individual zone L and R, between every two adjacent zones L and R. This state is shown highly diagrammatically in FIG. 4.

Furthermore, in FIG. 4, the image information, reproduced on screen 12, is represented by single pixels L11 to L20 and R11 to R20. The reference symbols, starting with L, characterize pixels, which contain image information for the left eye and the reference symbols, starting with R, characterize image information for the right eye. It can be seen that the image information for the left eye and the right eye are interleaved segmentally with one another. The segments 28, 30, 32 and 34 are in each case identified by a bold boundary around the associated pixels and, in the drawing, have a width of, in each case, 6 pixels. In practice, however, the number of pixels per segments can be significantly larger. Ideally, the position of the segments is determined by the position of the lens raster 18 and by the position of the eyes AL, AR, in such manner, that the L zones in each case lie centrally in a segment of L pixels and the R zones in each case lie centrally in a segment of R pixels. However, the segments extend beyond the L and R zones into the intermediate zones Z and lie without gaps against one another. Corresponding to the selection number 3, one-third of the pixels of each segment is invisible for the eye in question of the viewer. At the viewing distance, assumed for FIG. 4, the four middle pixels of each segment are visible, while the two pixels at the edge of the segment are invisible.

At the positions of the eye, LA and RA, those pixels, which are visible to the eye in question, are given in FIG. 4 in each case in one bar. For example, the left eye LA sees the four middle pixels L12 to L15 from segment 28 and the four middle pixels L16 to L19 from segment 32. Because of the magnifying action of the cylindrical lenses 22, these pixel sequences of, in each case, four pixels, seem to join together without a gap.

FIG. 4 shows only a small section from a scanning line. The left eye LA therefore also sees, in each case, the four middle pixels from further segments, which are not shown in FIG. 4. This is symbolized at the bottom in FIG. 4 by the pixels L11 and L20, which are shown by broken lines.

The segment 28 contains pixel L16 invisible at the right edge in the zone Z. This pixel represents the same image information as the first visible pixel L16 from the next zone L in segment 32. Likewise, the invisible pixel L11 at the left edge of zone 28 contains the same image information as the last visible pixel from the preceding L segment, which is not shown in FIG. 4. Conversely, segment 32 contains a copy of the last visible pixel L15 from segment 28 at the left edge and a copy of pixel L20 from the L segment following next at the right edge. The image information, shown on the screen 12, is thus redundant in that, for example, the pixels L15 and L16 are present twice.

Correspondingly, the pixels R15 and R16 for the right eye are also present twice in segments 30 and 34. The sense of this redundancy can be seen in FIG. 5. It is assumed there that the viewer has moved his head somewhat to the side, so that the position of the eyes LA and RA has been shifted a little to the left. Correspondingly, the visible zones on the screen 12 have been shifted to the right. The left eye LA can therefore now no longer perceive pixel L16 in segment 32. Instead, however, it now sees the same pixel L16 at the right edge of the segment 28. Correspondingly, the right eye RA can no longer see pixel R16 in segment 34; instead, it sees pixel R16 in segment 30. Likewise, the pixels L12 and R12, which now are no longer visible, are replaced by the corresponding pixels from the preceding (not shown) segments. Although the viewing position has changed, both eyes thus perceive the same pixel sequences unchanged as in FIG. 4. This is illustrated by the bars at the bottom in FIG. 5.

The corresponding applies, of course, when the user moves the head to the right. Accordingly, the user can vary his viewing position sideways within a limited region, without affecting the quality of the spatial perception. The user thus gains a certain freedom of movement even if the adjustment of the barrier and the image information, presented on the screen, are not changed. The larger the selection number of the barrier, the greater is the freedom of motion gained. When the number of pixels per segment is larger and the selection number is unchanged, the number of redundant pixels is also correspondingly larger.

Figure 5:
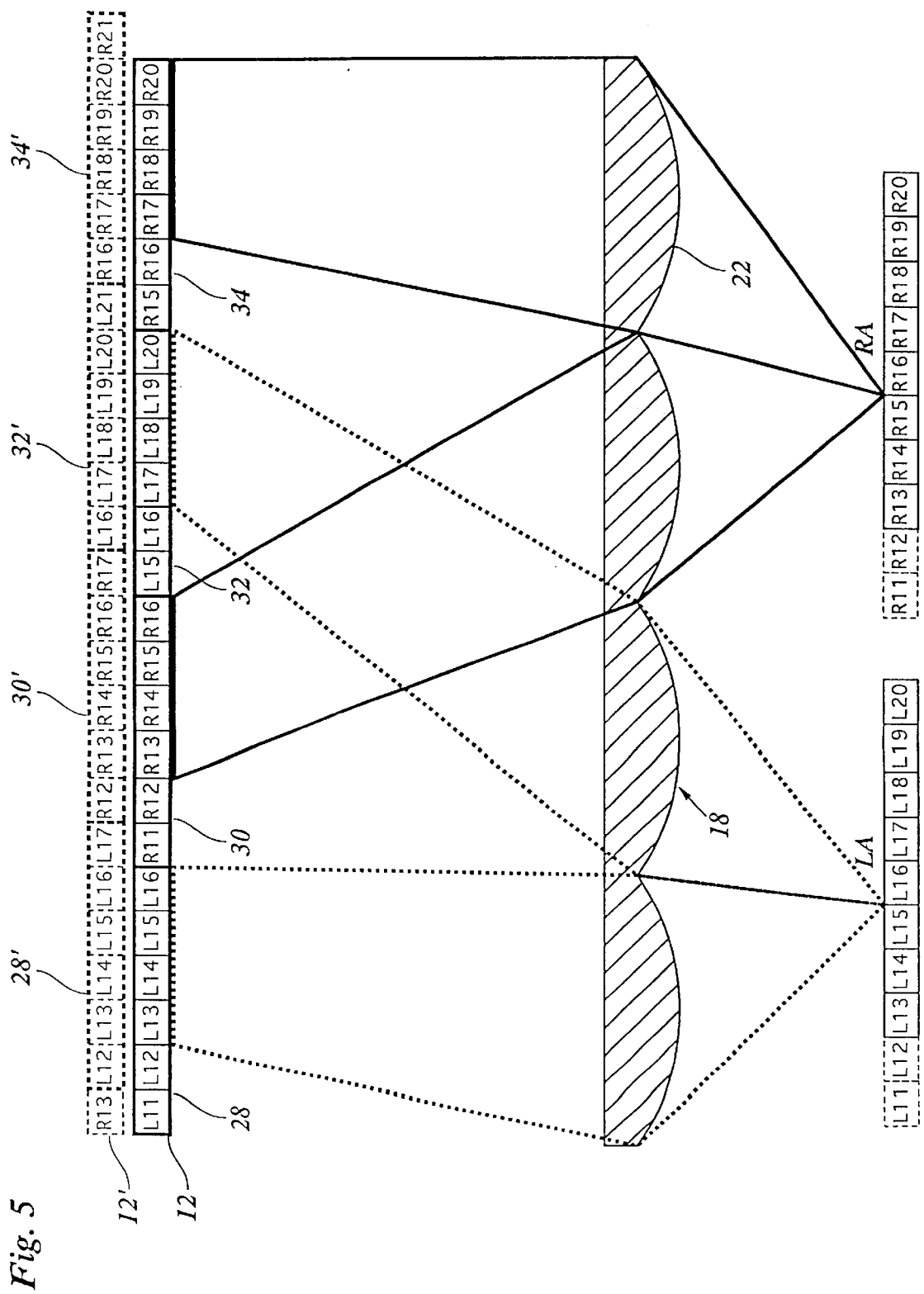

If, in the situation, shown in FIG. 5, the user would move his head even further to the left, the left eye would also perceive pixels R11 and R15, which are actually intended for the right eye, and the quality of the spatial perception would be affected. However, since the sideways movement of the user is detected by the eye-tracking system 16, the movement tolerance of the user can be enlarged even further owing to the fact that the contents, shown on the screen, are changed.

The new contents of the screen are shown in a bar 12' in FIG. 5. It can be seen that the segments 28', 30', 32' and 34', corresponding to the eye movement, were shifted by one pixel to the right. On the other hand, however, the contents of the segments were changed so that the pixels L12, L13, etc. are still at the same positions as before. Only the invisible pixel L11 at the left edge of the segment 28 is no longer contained in the new segment 28'. Instead, the new segment 28' contains, at the right edge, the invisible pixel L17, which was previously contained only in segment 32. Pixel L17 thus has now become a redundant pixel. Pictorially speaking, the informational content of each segment is "scrolled" in a direction opposite to the displacement direction of the segment. The result is that the middle four pixels are visible once again in each segment and the situation with regard to the invisible pixel is equivalent to the situation in FIG. 4. The user can therefore move the head even further to the left and will nevertheless still perceive the same spatial image unchanged. The adaptation process, illustrated in FIG. 5, can be repeated any number of times, corresponding to the further head movement of the user. Since the screen contents change in each case only in the invisible intermediate zones Z, it does not in any way matter for the image quality that the adaptation process necessarily lags somewhat behind the actual eye movement of the user.

If the user varies the viewing distance A, then this also has a certain effect on the position of the visible zones on the screen. In particular, a comparison of FIGS. 2 and 3 shows that all the zones R, L and Z, are extended in the line direction. This effect, however, in relation to the distance of the head movement, is significantly less pronounced than the sideways shift of the zones upon a lateral movement of the head. Slight changes in the distance of viewing therefore do not have a noticeable effect on the image quality. Moreover, within the scope of the inventive method, the possibility exists of adapting the width of the segments, that is, the number of pixels per segment, to the changes in the viewing distance. In this case also, the invisible intermediate zones, similar to the method described above, can be filled with redundant pixels. However, certain limitations arise out of the fact that, in the event that the viewing distance is not optimum, the two intermediate zones Z, which flank each zone L or R, no longer have the same width, so that the space at one end of the segment, available for redundant pixels, shrinks and finally is reduced to zero at the maximum or minimum viewing distance.

The information concerning the viewing distance, necessary for adapting the segment width to the viewing distance, can be supplied by the head tracking system or the eye tracking system.

Instead of varying the contents shown on the screen 12 corresponding to the sideways movement of the head of the viewer, it is, of course, also possible to adjust the lens raster 18 mechanically. In this case, the redundant screen representation of the invention is particularly advantageous, since even greater time delays are usually to be expected during the mechanical adaptation of the lens raster.

Alternatively, the lens raster 18 can also be formed by Fresnel lenses or by a system of a holographic, optical elements.

Figure 6:
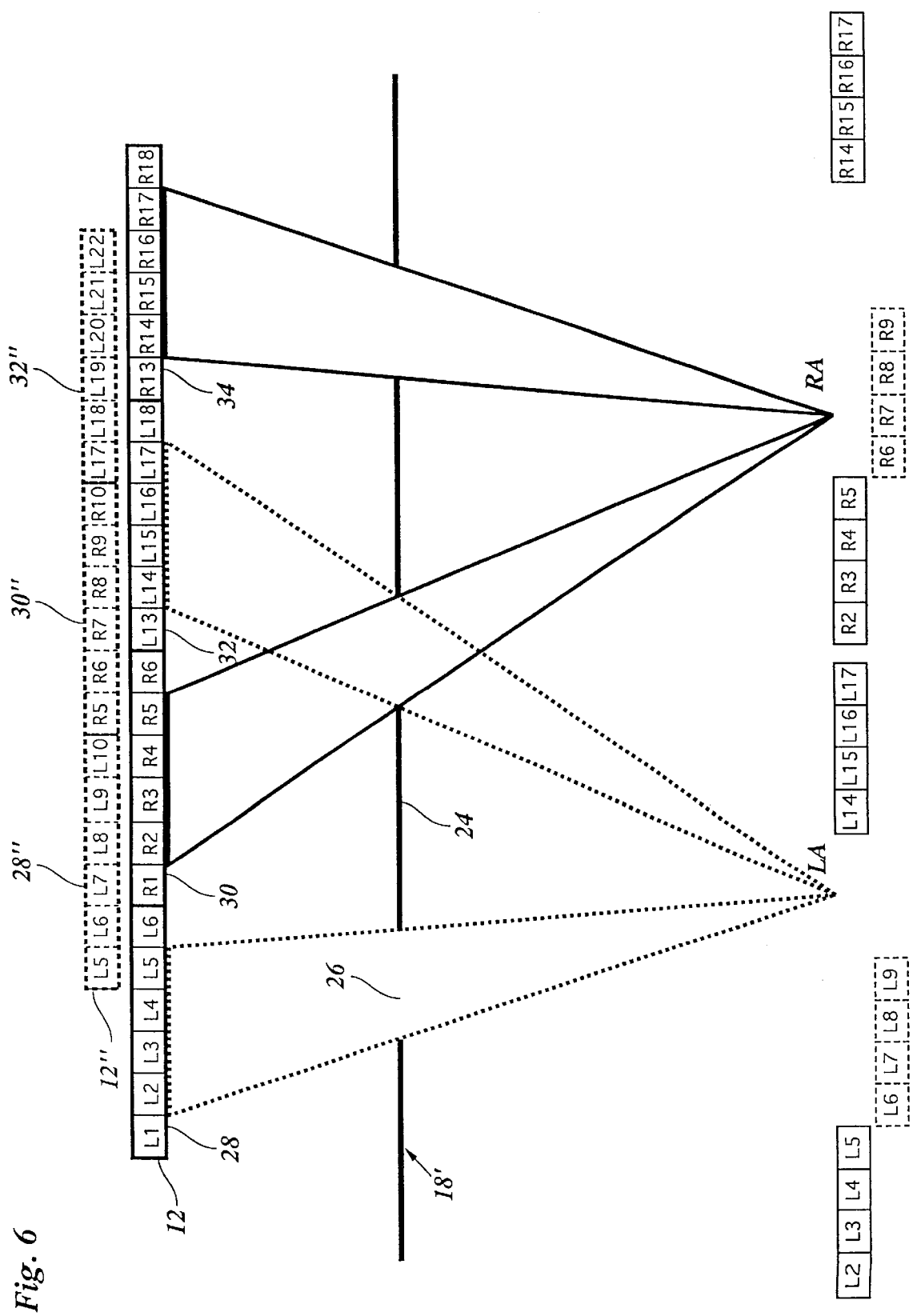
FIGS. 6 and 7 show diagrams to explain a second embodiment of the method and FIG. 8 shows a diagram to explain a method for improving the spatial resolution.
Figure 7:
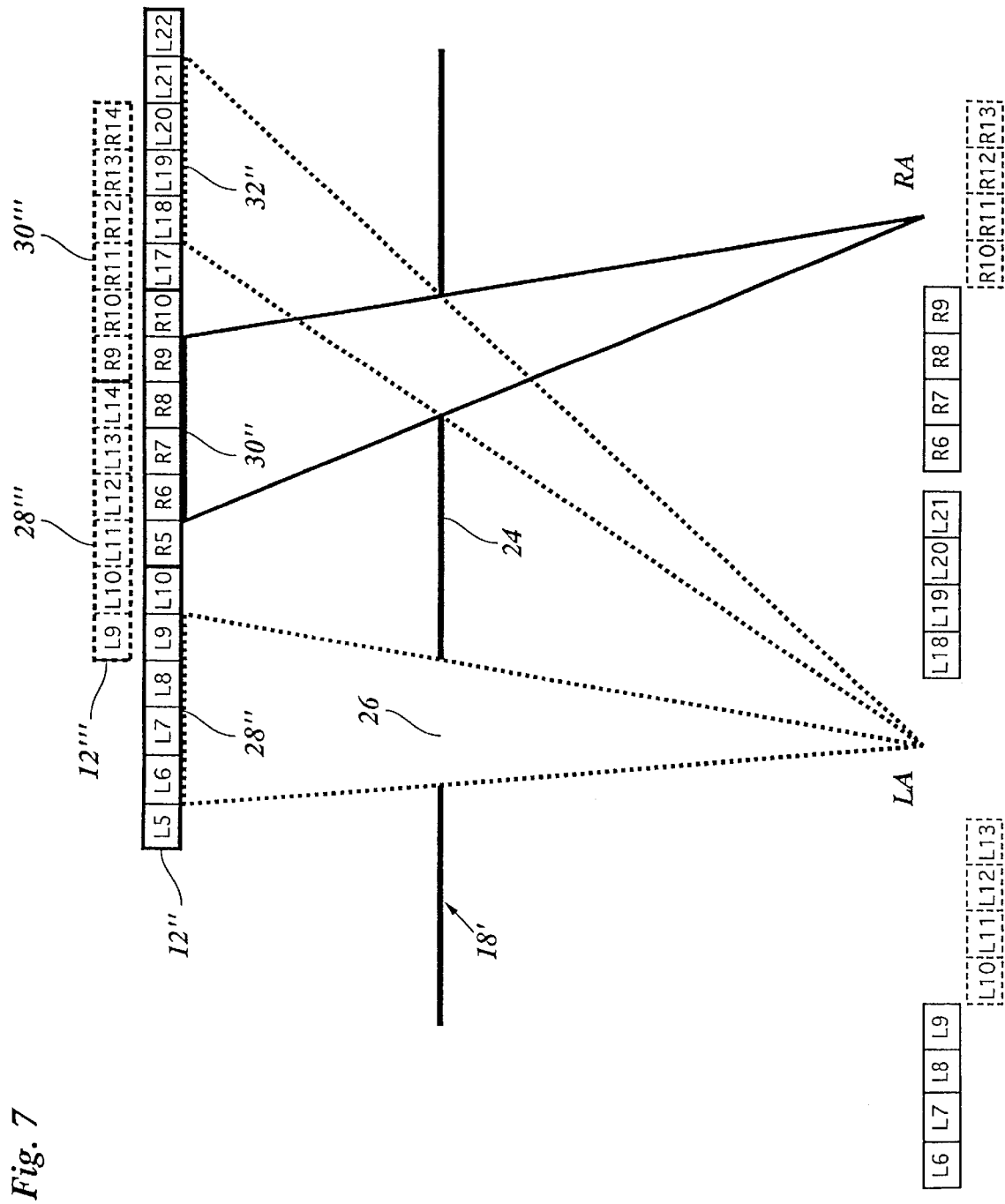

FIGS. 6 and 7 illustrated an embodiment, for which, similarly to the method described in the PCT/EP98/02869, a diaphragm raster 18' is used instead of a lens raster. The diaphragm raster is formed by an LCD filter with a fine pixel raster, the pixels of which can be toggled between transparent and opaque, so that a variable pattern of diaphragms 24 and slots 26 can be formed. Since in this case there is no magnifying action of the cylindrical lenses, less than half of the associated half image is visible to each eye. Time division multiplexing must therefore be used for the complete reproduction of the image information. A time division multiplex cycle comprises three phases, which alternate cyclically with one another. The corresponding screen contents are marked 12, 12" and 12'" in FIGS. 6 and 7.

FIG. 6 illustrates the first phase of the time division multiplex cycle. The diaphragms 24 and slots 26 provide the left eye with a view of the pixels L2 to L5 and L14 to L17 in segments 28 and 32 and the right eye, with a view of the pixels R2 to R5 and R14 to R17 in segments 30 and 34. The groups of four pixels each, originating from different segments, are now, however, perceived as being not magnified and therefore form a sequence with gaps, which is illustrated at the bottom of FIG. 6 by the pixels drawn by continuous lines. The gaps, existing between the sequences of pixels, are filled up in the second phase of the cycle by the pixels, drawn by broken lines in FIG. 6 and, in the third phase, by the pixels drawn by the broken lines in FIG. 7, so that, because of the inertia of the eye, the impression of a continuous sequence of pixels exists.

FIG. 7 shows the state of the diaphragm raster 18' in the second phase of the cycle. The diaphragms 24 and slots 26 are now offset to the right by a third of the pitch dimension. In this phase, the segments 28", 30" and 32" are shown on the screen in FIG. 7 (for reasons of space, segment 34" is not shown). The segments 28'" and 30'" for the third phase of the cycle are given by broken lines. The diaphragm raster 18' is once again displaced in the third phase by a third of the pitch dimension.

The redundant arrangement of the pixels in the segments corresponds to that of the previously described example. For example, in the first phase, the pixels L5 and L6 are reproduced in the segment 28 at the right edge; they contain the same image information as the first two pixels in segment 28", which is visible in the second phase.

If the screen 12 is a color screen, the objects, previously described as "pixels", are replaced by color triplets, which are formed, in each case, by three color pixels in the basic colors red, green and blue. In the case of a typical CRT or LCD color screen, the color pixels have the shape of elongated columns, which are disposed periodically in the sequences R-G-B-R-G- . . . in a line, as shown in the upper part of FIG. 8. Each three such color pixels form a triplet, which is to be regarded as a unit with respect to the image information, since the brightness relationships of the color pixels fix the shade of the color image element in question.

Figure 8:
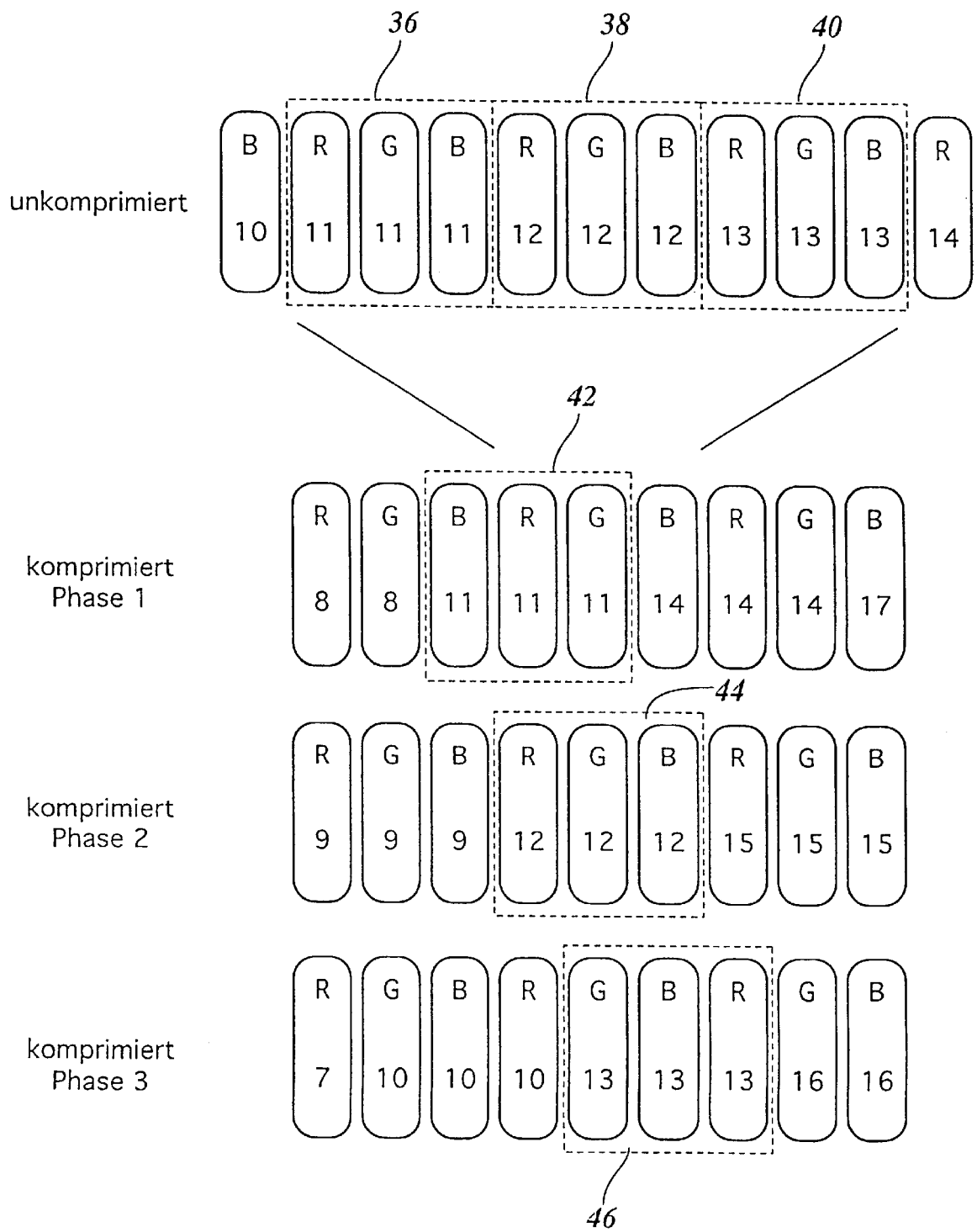

In an upper part of FIG. 8, three adjacent color triplets 36, 38 and 40 are shown, as they would appear on a normal color screen. If, however, in the case of the method shown in FIGS. 2 to 5, the image is to be enlarged with the help of cylindrical lens 22 by a factor of 3 in the line direction, the image information must previously be compressed by this factor, so that the complete image can be reproduced on the screen. Since the resolution of the screen is determined by the magnitude of the color triplets, this image transformation basically leads to a loss of information. However, FIG. 8 shows a method, with which this loss of information can be avoided or at least alleviated by the skilled control of the individual color pixels of the screen. This is possible, in the case of a cathode ray tube, by a suitable modulation of the electron beam and, in the case of an LCD screen, by appropriately controlling the individual LCD elements.

The image information, which was contained originally in the three triplets 36, 38, 40, represents three-color picture elements, which have the numbers 11, 12 and 13 in FIG. 8. This picture information is now reproduced on the screen in a time division multiplex method with a cycle consisting of three phases, as shown in the lower part of FIG. 8. In phase 1, three color pixels BRG are combined into a triplet 42, the center of which represents the position of the left color pixel R in the triplet 38. The color information of the image 11 is therefore reproduced completely in the triplet 42.

In phase 2, the color information of the image 12 is reproduced in a triplet 44, which comprises the color pixel RGB and the center of gravity of which corresponds to the position of the middle color pixel G in the triplet 38.

Finally, in phase 3, the information of the image 13 is reproduced in a separate 46, which is formed by the color pixels G, B, R and the center of gravity of which corresponds to the position of the right color pixel B in triplet 38.

If the cycle with these three phases is repeated in rapid sequence, the viewer gains the impression that the image is compressed without loss of detail on one-third of the original width. When the image is viewed through the cylindrical lens 22, it is expanded once again to the original size.

Admittedly, it cannot be prevented by this method that the raster of the color pixels, because of the enlarging effect of the cylindrical lenses, appears to be coarser. However, a larger wealth of image detail is achieved in comparison to a simple suppression of two of the original three image points 11, 12 and 13 or to an arithmetic or time averaging of the informational content of these image points.

In the following, the essential data for different practical realization examples of the device are given. In each case, a lens raster is used as barrier. Since the division of the lens raster (the width of an individual cylindrical lens) is not variable in this case, the upper and lower limits of the viewing distance depend on the respective distance between the eyes of the user. In the examples, it is assumed that the distance between the eyes is 65 mm.

15" LCD Screen

The screen is an LCD screen in TFT (thin film transistor) construction with a viewable screen diagonal of 38 cm and a maximum resolution of 1024×768 pixels. A single color triplet then has a width of 0.25 mm. The following data apply:

Selection number: 3.0

Pitch of the lens raster: 15.0 mm

Distance between the screen and the lens raster: 60 mm

Maximum viewing distance: 720 mm

Minimum viewing distance: 330 mm

Because of the magnifying effect of the cylindrical lenses, the apparent width of a color triplet is 0.75 mm. This corresponds to a resolution of a conventional television tube. The subjectively perceived resolution, however, is significantly higher, especially when the method illustrated in FIG. 8 is used.

21" CRT Screen

As screen device, a cathode ray color picture tube with a screen diagonal of 53 cm is used. The resolution is 1410×1054 pixels, corresponding to a width of an individual color triplet of 0.28 mm.

Selection number: 2.2

Pitch of the lens raster: 11.0 mm

Distance between the screen and the lens raster: 60 mm

Maximum viewing distance: 720 mm

Minimum viewing distance: 590 mm

Apparent width of a color triplet: 0.62 mm

Because of the horizontal compression of the image by the factor of ½.2, an effective resolution of 640×1054 pixels results.

40" Rear Projection Screen

A rear projection screen with a visible screen diagonal of 101.6 cm and a resolution of 1218×1024 pixels is used as screen.

Selection number: 3.0

Pitch of the lens raster: 15.0 mm

Distance between the screen and the lens raster: 100 mm

Maximum viewing distance: 1,200 mm

Minimum viewing distance: 550 mm

The width of a pixel would be 0.67 mm and, after magnification by the factor of three, about 2 mm. However, because of the principle of rear projection, the pixel raster cannot be perceived by the viewer.

In each case, a known head tracking system or eye tracking system or optional advanced gaze tracking system, for which the point on the screen, which is fixed at that time by the viewer, is also detected, can be used for the realizations described above.

In the simplest case, the three-dimensional image of the object, represented on the screen, is independent of the viewing position determined. It is, however, also possible to vary the image content dynamically as a function of the viewing position determined, so that changes in perspective can be simulated, which would result from viewing a real object from different positions.

What is claimed is:

1. A method for the autostereoscopic representation of images on a screen, comprising the steps of:

segmentally representing image information for a right eye and a left eye of a viewer interleaved in segments on the screens, disposing a barrier between the screen and the left and right eyes, so that, for each eye, in each case, only the image information associated with that eye is visible, and presenting in each segment, in addition to the image information assigned to that segment, a copy of a portion of the image information which is assigned to at least one adjacent segment for the same eye.

2. The method of claim 1, further comprising the steps of:

continuously determining a position of a head or eye of the viewer, and varying at least one of the position of the barrier relative to the screen and the position of the image information presented on the screen as a function of the viewing position, which has been determined.

3. The method of claim 2, further comprising the steps of:

maintaining the barrier stationary in the event that a lateral movement of the head of the viewer has been determined, and shifting boundaries between the segments on the screen, the image information on the screen being changed only in zones invisible to both eyes in surroundings of the segment boundaries.

4. The method of claim 3, further comprising the steps of:

using a lens raster as the barrier, with the lens raster having individual lenses which enlarge the image, presented on the screen, at least in a line direction by a specified factor, and presenting the interleaved image information for the left eye and the right eye on the screen in a form, which is compressed in the line direction by this factor.

5. The method of claim 4, further comprising the steps of:

disposing the image on a color screen with color pixels disposed offset in the line direction, representing the image information for three adjacent color triplets, forming a colored image point, on the screen by a time division multiplex method, the three color pixels, which are combined to represent a color triplet, in each case being offset from one another by one color pixel.

6. A device for the autostereoscopic representation of images, for carrying out the method of claim 3, comprising:

a screen which is controlled by a computer and on which the image information for the right eye and the left eye of the viewer, controlled by the computer, is shown segmentally interleaved, and a barrier in the form of a lens raster, which is disposed in front of the screen in such a manner that, for each eye, in each case, only an associated image information is visible, said lens raster having lenses and each individual lens of the lens raster defining exactly one segment visible to the left eye and one segment visible to the right eye, wherein a width of the segments in the line direction in each case corresponds to several screen pixels.

7. The device of claim 6, wherein a distance between the lens raster and the screen, and imaging properties of the lens, are adapted to a specified viewing distance ($A_0$) in such a manner, that mutually interleaved segments are separated from one another on the screen in each case by an intermediate zone, which is invisible to both eyes.

8. The device of claim 7, further comprising one of a head tracking and eye tracking system, connected to the computer, and which determines a viewing position assumed by a viewer and adapts the image information shown to this viewing position.

9. The method of claim 2, further comprising the steps of:

using a lens raster as the barrier, with the lens raster having individual lenses which enlarge the image, presented on the screen, at least in a line direction by a specified factor, and presenting the interleaved image information for the left eye and the right eye on the screen in a form, which is compressed in the line direction by this factor.

10. The method of claim 9, further comprising the steps of:

disposing the image on a color screen with color pixels disposed offset in the line direction, representing the image information for three adjacent color triplets, forming a colored image point, on the screen by a time division multiplex method, the three color pixels, which are combined to represent a color triplet, in each case being offset from one another by one color pixel.

11. A device for the autostereoscopic representation of images, for carrying out the method of claim 2, comprising:

a screen which is controlled by a computer and on which the image information for the right eye and the left eye of the viewer, controlled by the computer, is shown segmentally interleaved, and a barrier in the form of a lens raster, which is disposed in front of the screen in such a manner that, for each eye, in each case, only an associated image information is visible, said lens raster having lenses and each individual lens of the lens raster defining exactly one segment visible to the left eye and one segment visible to the right eye, wherein a width of the segments in the line direction in each case corresponds to several screen pixels.

12. The device of claim 11, wherein a distance between the lens raster and the screen, and imaging properties of the lens, are adapted to a specified viewing distance ($A_0$) in such a manner, that mutually interleaved segments are separated from one another on the screen in each case by an intermediate zone, which is invisible to both eyes.

13. The device of claim 12, further comprising one of a head tracking and eye tracking system, connected to the computer, and which determines a viewing position assumed by a viewer and adapts the image information shown to this viewing position.

14. The method of claim 1, further comprising the steps of:

using a lens raster as the barrier, with the lens raster having individual lenses which enlarge the image, presented on the screen, at least in a line direction by a specified factors, and presenting the interleaved image information for the left eye and the right eye on the screen in a form, which is compressed in the line direction by this factor.

15. The method of claim 14, further comprising the steps of:

disposing the image on a color screen with color pixels disposed offset in the line direction, representing the image information for three adjacent color triplets, forming a colored image point, on the screen by a time division multiplex method, the three color pixels, which are combined to represent a color triplet, in each case being offset from one another by one color pixel.

16. A device for the autostereoscopic representation of images, for carrying out the method of claim 14, comprising:

a screen which is controlled by a computer and on which the image information for the right eye and the left eye of the viewer, controlled by the computer, is shown segmentally interleaved, and a barrier in the form of a lens raster, which is disposed in front of the screen in such a manner that, for each eye, in each case, only an associated image information is visible, said lens raster having lenses and each individual lens of the lens raster defining exactly one segment visible to the left eye and one segment visible to the right eye, wherein a width of the segments in the line direction in each case corresponds to several screen pixels.

17. The device of claim 16, wherein a distance between the lens raster and the screen, and imaging properties of the lens, are adapted to a specified viewing distance ($A_0$) in such a manner, that mutually interleaved segments are separated from one another on the screen in each case by an intermediate zone, which is invisible to both eyes.

18. A device for the autostereoscopic representation of images, for carrying out the method of claim 1, comprising:

a screen which is controlled by a computer and on which the image information for the right eye and the left eye of the viewer, controlled by the computer, is shown segmentally interleaved, and a barrier in the form of a lens raster, which is disposed in front of the screen in such a manner that, for each eye, in each cases only an associated image information is visible, said lens raster having lenses and each individual lens of the lens raster defining exactly one segment visible to the left eye and one segment visible to the right eye, wherein a width of the segments in the line direction in each case corresponds to several screen pixels.

19. The device of claim 18, wherein a distance between the lens raster and the screen, and imaging properties of the lens, are adapted to a specified viewing distance ($A_0$) in such a manner, that mutually interleaved segments are separated from one another on the screen in each case by an intermediate zone, which is invisible to both eyes.

20. The device of claim 19, further comprising one of a head tracking and eye tracking system, connected to the computer, and which determines a viewing position assumed by a viewer and adapts the image information shown to this viewing position.

* * * * *